United States Patent [19]
Bachman

[11] 3,872,876
[45] Mar. 25, 1975

[54] PNEUMATIC CONTROL
[75] Inventor: Robert Theophil Bachman, Oberengstringen, Switzerland
[73] Assignee: Luwa AG, Zurich, Switzerland
[22] Filed: Oct. 9, 1973
[21] Appl. No.: 404,139

Related U.S. Application Data
[63] Continuation-in-part of Ser. No. 274,755, July 24, 1972, abandoned.

[30] Foreign Application Priority Data
July 30, 1971 Switzerland.......................... 011232

[52] U.S. Cl.................... 137/118, 91/38, 91/40, 137/624.14, 137/624.15, 137/624.2
[51] Int. Cl...................... F15b 21/02, F15b 21/10
[58] Field of Search ......... 91/305, 306, 308, 38, 40; 137/624.13, 624.14, 624.15, 624.18, 624.2, 118, 119

[56] References Cited
UNITED STATES PATENTS
2,760,511  8/1956  Greeff...................... 137/624.15 X
3,332,443  7/1967  Mize........................... 137/624.14
3,446,207  5/1969  Metivier.................... 137/624.14 X
3,604,415  9/1971  Hoenig....................... 137/624.14 X
3,620,127  11/1971 Blaisdell..................... 137/624.14 X Primary Examiner—Alan Cohan
Assistant Examiner—Gerald A. Michalsky
Attorney, Agent, or Firm—Werner W. Kleeman

[57] ABSTRACT

A pneumatic control for automatically repeating an operational cycle, especially a movement cycle, comprising a series connection of a logical NOT-element and at least two logical timing-elements, each timing element having a respective throttle, volume chamber and identity-element, means for feeding essentially the same input reference signal to the input side of the identity-element, a supply conduit for a supply pressure with which the NOT-element is connected, the last logical timing-element having an outlet, and a switching conduit for connecting the outlet of the last timing-element of the control with the NOT-element.

4 Claims, 3 Drawing Figures

PNEUMATIC CONTROL

CROSS-REFERENCE TO RELATED CASE

This is a continuation-in-part application of my commonly assigned, copending United States application, Ser. No. 274,755, filed July 24, 1972, now abandoned.

BACKGROUND OF THE INVENTION

The present invention relates to a new and improved pneumatic control for automatically repeating an operational cycle, particularly for automatically repeating a movement course or cycle.

There is already known to the art an apparatus for controlling a pneumatically actuated double-acting cylinder. This control renders possible a continuous retraction and ejection of a piston within the cylinder. The air required for actuating the control apparatus is simultaneously employed as the air current for actuating the cylinder.

For this purpose, the control air pressure and the working pressurized air are delivered through the agency of a pneumatically actuated 4/2-way piston valve. Both pressure air connections of the cylinder are additionally coupled with a respective switching conduit of a therewith associated logical NOT-element.

The outlet conduits of such NOT-element are each connected with the end of a cylinder compartment of the piston valve, the outlet of the NOT-element being connected with the piston compartment of the piston valve which owing to the action of the pressure switches the piston valve in such a manner that the pressure signal of the pressurized air flowing through the piston valve negates or eliminates the outlet signal of the aforementioned NOT-element.

During operation of this known apparatus, the two supply conduits of the NOT-element are supplied with the pressurized or compressed air. The same pressurized air system is delivered through a throughpassage of the piston valve into the associated piston compartments of the cylinder to be actuated. The pressure signal produced by the compressed air delivers its impulse to the NOT-element connected with such conduit and negates the outlet of such NOT-element, that is to say, the outlet appears to be without pressure. The piston displaced by the compressed air displaces the air out of the second cylinder compartment and such displaced air is expelled into the atmosphere through the agency of the piston valve. As a result, there is an overpressure, the signal of which likewise negates the NOT-element connected with this conduit. As a result, the pistons of the piston valve appear to be without pressure at both faces.

As soon as the piston has reached a first terminal position, then the pressure impulse collapses, brought about by the displaced air. The associated NOT-element thus frees the passage for the control air which displaces the piston valve into a second terminal position and therefore the compressed air is conducted into the just vented cylinder compartment. Consequently, the piston is displaced into the second terminal position, whereby the displaced air likewise delivers the signal for negation purposes to the associated NOT-element. Upon disappearance of this signal, compressed air is again delivered to the piston valve via the NOT-element which has been negated by the pressure signal of the displaced air and thus such piston valve is shifted back into the first terminal position. This movement course or cycle continues for such length of time until the supply conduit for the compressed air is cut-off or interrupted.

However, the aforementioned known control apparatus possesses the drawback that owing to the use of the control-compressed air stream, as the supply air for the pressure cylinder, as well as owing to resorting to the use of the cylinder as a control element, it is only possible to actuate a cylinder having a small diameter. This disadvantage is predicated upon the fact that the available throughflow cross-section at the control elements must be dimensioned in such a manner that larger air quantities cannot flow through for rapid actuation of the cylinder. It has been proposed to arrange additional valves at the air inlet of the cylinder for such control apparatus which would render it possible to infeed a larger quantity of air to the cylinder. However, such type equipment requires a considerably greater expenditure in control elements which impermissibly increases the entire control.

SUMMARY OF THE INVENTION

Hence, from what has been discussed above, it should be apparent that there is still a need in this art for an improved pneumatic control which is not associated with the aforementioned drawbacks and limitations of the aforementioned proposals in the art. Thus, it is a primary object of the present invention to effectively and reliably fulfill the existing need in the art and overcome the aforementioned drawbacks existent with the prior art proposals.

Still a further object of the present invention relates to a new and improved construction of pneumatic control for effectively controlling the automatic repetition of an operational cycle, in particular a movement course or program, and specifically in a highly efficient, reliable and accurate manner.

Yet a further significant object of the present invention relates to an improved pneumatic control for automatically repeating a movement course or operational cycle reliably, accurately and with a control which is relatively simple in design, economical to manufacture, not readily subject to breakdown or malfunction, and requires a minimum of servicing and maintenance.

Now in order to implement these and still further objects of the invention, which will become more readily apparent as the description proceeds, the inventive pneumatic control for automatically repeating an operational cycle, especially a movement cycle, comprises a series connection of a logical NOT-element and at least two logical timing elements, each timing element having a respective throttle, volume chamber and identity element, means for feeding essentially the same input reference signal to the input side of each identity-element, a supply conduit for a supply pressure with which the NOT-element is connected, the last logical timing element having an outlet, and a switching conduit for connecting the outlet of the last timing-element of the control with the NOT-element. A further aspect of the invention contemplates that the feeding means comprises a common source for feeding essentially the same input reference signal to the input side of each identity-element.

The inventive control apparatus has the advantage in contrast to the heretofore known controls that such itself can carry out the movement cycle which is to be controlled for a machine element independent of the machine element. Also the inventive control apparatus possesses the advantage that it can be randomly increased in size, that is to say, there can be arranged in series a random number and randomly different logical elements. What is significant for the automatic course of the operational cycle is only that a pressure signal at the outlet of the last control element can be fed back to the switching conduit of the logical NOT-element.

A not inconsequential advantage of the system of this invention in contrast to the heretofore known controls resides in the feature that there is present a separation of the control air pressure from the working air pressure. As a result, with the smallest quantities of pressurized air, controls can be actuated which, in turn, are capable of controlling the movement cycle of machine elements which require a multiple or many times compressed air in contrast to the quantities of control compressed air.

A further advantage of the inventive control resides in the fact that this control renders possible the automatic repetition of the movement cycle without having to resort to the aid of the machine element to be controlled.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
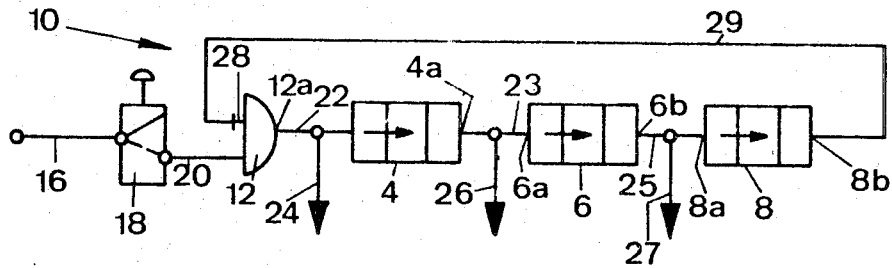
FIG. 1 is a block circuit diagram of a control utilizing the teachings of the invention.

Describing now the drawing, in FIG. 1 reference numeral 10 generally indicates a logical circuit formed of conventional pneumatic or fluidic elements, for instance of the type disclosed by way of example in U.S. Pat. No. 3,604,415. In particular, this logical circuit 10 will be understood to embody a logical NOT-element and at least two logical timing-elements; in the exemplary embodiment there being arranged a series connection of a logical NOT-element 12 and three logical timing or timer elements 4, 6 and 8, each of which is successively switched-in with a time-delay as will be more fully disclosed hereinafter. The logic or logical NOT-element 12 is coupled with a supply conduit 20, in front of which there is connected a valve 18 as well as a further supply conduit 16. The logic NOT-element 12 is operatively coupled at its outlet 12a by means of connection conduit 22 with the first logical timing element 4. A control conduit 24 is coupled in airflow communication with the connection conduit 22. The outlet 4a of the first series connected logical timing element 4 is connected via connection conduit 23 with the inlet 6a of the second logical timing or timer element 6. Once again a control conduit 26, for example leading to any desired controlled element, is connected in airflow communication with the connection conduit 23. In similar fashion the outlet 6b of the logical timing or timer element 6 is connected via a connection conduit 25 with the input 8a of the logical timing element 8, and again a control conduit 27 is coupled in airflow communication with the connection conduit 25. Finally, the outlet 8b of the timing element 8 is connected in airflow relationship via a switching conduit 29 with a switching signal inlet or inlet connection 28 of the NOT-element 12.

During operation of the logical circuit 10, a pressurized air signal is delivered via the supply conduits or lines 16 and 20 as well as the closed valve 18 to the logical NOT-element 12. Under the term "closed" as applied to valve 18 or the like there is meant that position of the valve which permits the flow of fluid medium from supply line 16 to supply line 20. This pressurized air signal is delivered via the NOT-element 12 and the connection conduit 22 to the timing element 4. At the same time, the pressure signal is delivered as an output signal via the control conduit 24 to a switching element, for instance a pressure regulation valve or cylinder. After the pressure signal has passed through the logical switch-in time-delayed timing element 4 it arrives via the conduit 23 at the next series connected logical timing element 6 and then via the conduit 25 at the last illustrated logical timing element 8. Further, just as was the case for the logical timing element 4, a pressure signal defining a respective output signal can be delivered via the corresponding control conduits 26 and 27 to a suitable switching element, again for instance a pressure regulation valve or cylinder or a signal lamp, purely by way of example.

Now after the pressure signal has passed through the three successively connected logical switch-in time-delayed timing elements 4, 6, and 8, the corresponding signal is delivered to the logical NOT-element 12 via the switching conduit 29 and the switching signal inlet 28 of such NOT-element 12. As a result, the pressure signal at the supply line or conduit 20 is negated or eliminated, that is, the pressure signal at the conduit 22 is extinguished, so that the connection conduit 22 is placed into its pressureless state or condition. However, as soon as the pressure has dropped at the connection conduit 22, there likewise is missing at the switching signal inlet 28 of the NOT-element 12 the pressure signal, so that the NOT-element 12 again frees the path for the pressure signal in the supply conduit 20. Now the cycle of the pressure signal can again begin via the series connected logic timing elements 4, 6, 8 and the switching conduit 29. This control cycle automatically repeats as long as the valve 18 remains closed.

Figure 2:
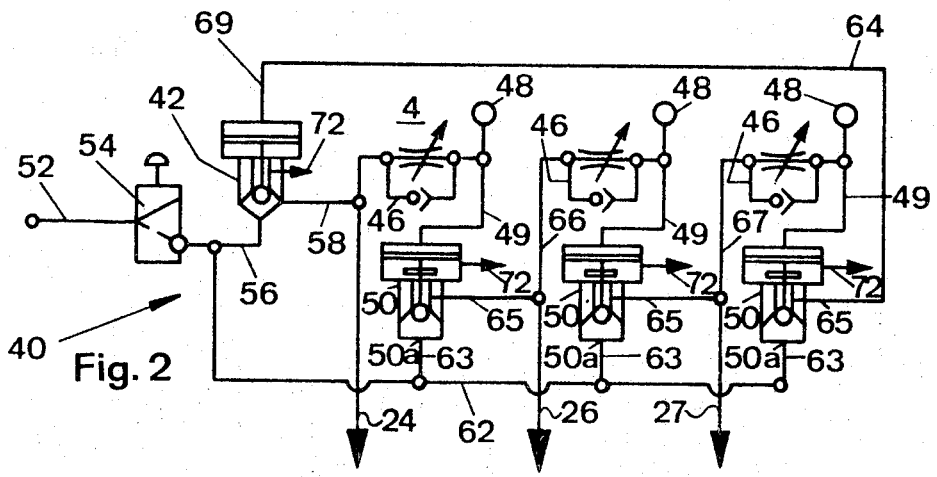
FIG. 2 is a functional circuit diagram illustrating the mode of operation of the control depicted in FIG. 1.

In FIG. 2 there has been functionally depicted the same control as that described in conjunction with FIG. 1, but illustrating further details of the logical circuit. Here, reference character 40 generally designates the circuit arrangement of such control. In this exemplary illustrated embodiment reference character 42 designates the logical NOT-element connected in series with the three logic switch-in time-delayed timing elements 4, 6, and 8 respectively. Since each of the three depicted logical timing elements 4, 6 and 8 are of the same construction, it will be sufficient to simply generally consider the structure of one of the timing elements, such as the timing element 4. Hence, it will be recognized that timing element 4 possesses a throttle check valve arrangement 46, a volume chamber 48 and a logic identity or identification element 50. The pressure signal is introduced to the logical NOT-element 42 via the supply conduits or lines 52 and 56 as well as valve 54, from which location it is fed through the agency of a connection conduit 58 into the switch-in time-delayed timing element 4. By means of the throttle check valve arrangement 46 the compressed air is throttled and flows into the volume chamber 48 from which location it is delivered via a conduit 49 into the identity element 50. At the same time, the pressure signal is delivered from the supply conduit 56 via a bypass conduit 62 and the respective switching signal inlet connections 63 as an input reference signal to the corresponding input 50a of each associated identity element 50 of each of the timing elements 4, 6, 8. As soon as the pressure in the conduit 49 of the first logical timing element 4 amounts to for instance about 60 percent of the pressure at the corresponding switching signal inlet connection 63, the associated identity element 50 suddenly switches, so that at the outlet 65 of such identity element 50 there appears a pressure signal which is delivered via conduit 66 to the next logical timing element 6 where the aforedescribed process repeats, and thus the signal at the outlet 65 of the identity element 50 of the second logical circuit is then delivered via the conduit 67 to the last logical timing element 8. Again, as soon as the pressure in the conduit 49 of the last logical timing element 8 amounts to for instance about 60 percent of the pressure at the switching signal inlet connection 63, then the identity element 50 thereof suddenly switches, so that at the outlet 65 of such identity element 50 of the logical timing element 8 there appears a pressure signal which is delivered via a conduit 64 and the switching signal inlet or inlet connection 69 to the NOT-element 42. As soon as the pressure at the signal inlet connection 69 amounts to for instance 20% of the pressure at the supply conduit 56, then, the pressure signal appearing at the connection conduit 58 is negated or eliminated, that is, the pressure at the connection conduit 58 collapses. Since as a result thereof there is absent a pressure signal throughout the entire system, the negation at the NOT-element 42 is eliminated, so that the pressure signal of the supply conduit 56 again appears at the connection conduit 58 and therefore a new cycle of the control program or operation can again occur, as discussed above in connection with FIG. 1. This cycle is only then interrupted when the valve 54 is opened. Finally, it is mentioned that the arrows designated by reference character 72 in FIG. 2 represent the exhaust ports or passages of the associated NOT-element and identity-element 50, and which components along with the throttle check valve arrangement are conventional in the art, as mentioned above, and exemplified for instance in U.S. Pat. No. 3,604,415 incorporated herein by reference.

Figure 3:
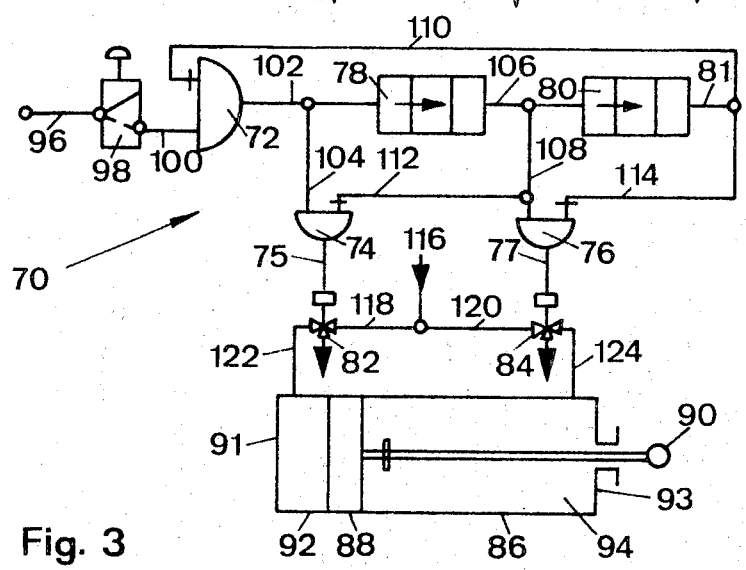
FIG. 3 is a schematic illustration of a control for a cylinder and designed according to the teachings of the present invention.

Now in FIG. 3, this control will be more fully explained in conjunction with a further exemplary embodiment. The control is generally designated by reference character 70 and possesses the logical NOT-element 72, 74 and 76 which together with the logical switch-in time-delayed timing elements 78 and 80 actuate the three-way valves 82 and 84. These three-way valves 82 and 84 cooperate with a cylinder 86 having a piston 88 as well as a piston rod 90. The free space or compartment between the cylinder cover 91 and the face of the piston 88 facing away from the piston rod 90 has been designated by reference character 92. The free space accommodating the piston rod 90 and between the piston cover 93 and the face of the piston 88 receiving the piston rod has been designated by reference character 94.

During operation of this apparatus, a pressure signal is delivered to the NOT-element 72 through the agency of the supply conduits 96 and 100 and the intermediately disposed valve 98. This pressure signal passes through the NOT-element 72 and then arrives via the connection conduit 102 at the timing element 78. However, this pressure signal simultaneously arrives via the control conduit 104 at the second NOT-element 74 and via such and an outlet conduit 75 at the three-way valve 82. By means of this pressure signal, the three-way valve 82 is opened and the compressed air intended for actuating the piston 88 flows via separate compressed air conduits 116 and 118 as well as the released or open supply conduit 122 into the cylinder compartment 92. Owing to the inflowing compressed air the piston 88 is moved such that the piston rod 90 is ejected out of the cylinder 86. The air displaced owing to the movement of the piston 88, in the cylinder compartment 94 can flow into the surrounding atmosphere via a supply conduit 124 associated with such compartment 94 and the three-way valve 84 which is coupled in air flow communication with such conduit 124. During actuation of the cylinder 86, the pressure signal, introduced into the timing element 78, has penetrated through this timing element 78 and now appears at a further connection conduit or line 106. This pressure signal is now delivered simultaneously to the switch-in time-delayed timing element 80 as well as via the supply conduit 108 to the third NOT-element 76. However, as soon as the pressure signal appears at the supply conduit 108, such propagates such pressure signal also via a switching conduit 112 back to the NOT-element 74, so that the output signal at the conduit 75 of the NOT-element 74 is negated, that is, the pressure signal at the conduit 75 collapses and the valve 82 is switched. As a result, the cylinder compartment 92 is vented via supply conduit 122 and the three-way valve 82. However, during this operation, the pressure signal of the supply conduit 108 has been delivered via the NOT-element 76 and an outlet conduit 77 to the three-way valve 84. As a result, the three-way valve 84 opens the passage for the compressed or pressurized air through the pressure air conduits 116, 120, which air then flows via the supply conduit 124 into the cylinder compartment 94 where it again retracts the piston 88 with the piston rod 90 back into the cylinder 86.

During this operation, the pressure signal has now passed through the timing element 80 and appears at its outlet conduit 81, from which location it arrives through the agency of the switching conduit 114 at the NOT-element 76 and the pressure signal at the outlet conduit 77 of the NOT-element 76 is negated, that is, interrupted. As a result, the piston compartment 94 is vented via the supply conduit 124 and the three-way valve 84. On the other hand, the pressure signal of the outlet conduit 81 arrives via the switching conduit 110 at the NOT-element 72 where it negates the starting signal at the supply conduit 100, that is interrupts the pressure signal at the connection conduit 102. As a result, the pressure in the entire control system collapses, so that the pressure signal at the conduit 100 can again arrive via the NOT-element 72 at the intermediate conduit 102 and the control operation or cycle can then begin anew. Of course, to simplify the drawing illustration the NOT-elements and timing element have been only schematically illustrated but are constructed for instance as discussed above in conjunction with FIG. 2.

It is of course conceivable that with this circuit there can be assembled together a random or optional number of combinations of logical switching elements which bring about an automatic repetition of an operational cycle or movement cycle. What is essential for each of such circuits, however, is the fact that the pressure signal emanating from the last element of an element circuit is delivered back to the switching connection of the NOT-element at the beginning of the circuit. This pressure signal must, on the one hand, interrupt the entire pressure signal at the control conduits, yet simultaneously however render possible an automatic repetition of the entire control cycle or operation.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A pneumatic control for automatically repeating an operational cycle, especially a movement cycle, comprising a series connection of a logical NOT-element and at least two logical timing elements, each logical timing element having an input side and an output side and a respective throttle, volume chamber and identity-element, each identity-element having an input side, means for feeding essentially the same input reference signal to the input side of each identity-element, a supply conduit for a supply pressure with which the NOT-element is connected, the last logical timing element having an outlet, a switching conduit for connecting the outlet of the last timing element of the control with the NOT-element, and means for removing from at least one of said logical timing elements a respective output signal at both the input side and the output side of said at least one logical timing element.

2. The pneumatic control as defined in claim 1, wherein the feeding means comprises a common source for feeding essentially the same input reference signal to the input side of each identity-element.

3. A pneumatic control for automatically repeating an operational cycle, especially a movement cycle, comprising a series connection of a logical NOT-element and at least two logical timing elements, each timing element having a respective throttle, volume chamber and identity-element, each identity-element having an input side, means for feeding essentially the same input reference signal to the input side of each identity-element, a supply conduit for a supply pressure with which the NOT-element is connected, the last logical timing element having an outlet, a switching conduit for connecting the outlet of the last timing element of the control with the NOT-element, each logical timing element having an input and an output, a respective said logical NOT-element connected between the input and output of each associated logical timing element, each logical NOT-element having two inputs and an output, one of said inputs being connected with the input of the associated logical timing element and the other input being connected with the output of such associated timing element, and wherein a signal appears at the output of each logical NOT-element when only one of the inputs thereof carries a signal thereon, and further wherein the signal appearing at the output of each logical timing element serves to negate the signal appearing at the output of each associated logical NOT-element.

4. A pneumatic control for automatically repeating an operational cycle, especially a movement cycle, comprising a series connection of a logical NOT-element and at least two logical timing elements, each timing element having a respective throttle, volume chamber and identity-element, each identity-element having an input side, means for feeding essentially the same input reference signal to the input side of each identity-element, a supply conduit for a supply pressure with which the NOT-element is connected, the last logical timing element having an outlet, and a switching conduit for connecting the outlet of the last timing element of the control with the NOT-element, and wherein the output signal of the first of said series connected logical timing elements serves as an input signal for each of two logical NOT-elements.

* * * * *